USO08578351B2

(12) United States Patent
Nair et al.

(10) Patent No.: US 8,578,351 B2
(45) Date of Patent: Nov. 5, 2013

(54) HYBRID MECHANISM FOR MORE EFFICIENT EMULATION AND METHOD THEREFOR

(75) Inventors: Ravi Nair, Briarcliff Manor, NY (US); John Kevin O'Brien, South Salem, NY (US); Kathryn Mary O'Brien, South Salem, NY (US); Peter Howland Oden, Ossining, NY (US); Daniel Arthur Prener, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 13/311,858

(22) Filed: Dec. 6, 2011

(65) Prior Publication Data

US 2012/0089820 A1 Apr. 12, 2012

Related U.S. Application Data

(62) Division of application No. 10/244,682, filed on Sep. 17, 2002, now Pat. No. 8,108,843.

(51) Int. Cl.
*G06F 9/45* (2006.01)
*G06F 9/44* (2006.01)

(52) U.S. Cl.
USPC ............ 717/139; 717/114; 717/148; 717/158

(58) Field of Classification Search
None
See application file for complete search history.

(56) References Cited

U.S. PATENT DOCUMENTS

| 4,392,196 A | 7/1983 | Glenn et al. |
| 4,564,903 A | 1/1986 | Guyette et al. |
| 4,989,132 A | 1/1991 | Mellender et al. |
| 5,055,999 A | 10/1991 | Frank et al. |
| 5,307,477 A | 4/1994 | Taylor et al. |
| 5,388,215 A | 2/1995 | Baker et al. |
| 5,390,309 A | 2/1995 | Onodera |
| 5,440,710 A | 8/1995 | Richter et al. |

(Continued)

FOREIGN PATENT DOCUMENTS

| JP | 63-226740 | 9/1988 |
| JP | 07-271738 | 10/1995 |

(Continued)

OTHER PUBLICATIONS

Ung et al., Machine-adaptable dynamic binary translation, Jan. 2000, 11 pages.*

(Continued)

*Primary Examiner* — Thuy Dao
(74) *Attorney, Agent, or Firm* — McGinn IP Law Group, PLLC

(57) ABSTRACT

In a host system, a method for using instruction scheduling to efficiently emulate the operation of a target computing system includes preparing, on the host system, an instruction sequence to interpret an instruction written for execution on the target computing system. An instruction scheduling on the instruction sequence is performed, to achieve an efficient instruction level parallelism, for the host system. A separate and independent instruction sequence is inserted, which, when executed simultaneously with the instruction sequence, performs to copy to a separate location a minimum instruction sequence necessary to execute an intent of an interpreted target instruction, the interpreted target instruction being a translation; and modifies the interpreter code such that a next interpretation of the target instruction results in execution of the translated version, thereby removing execution of interpreter overhead.

7 Claims, 6 Drawing Sheets

(56) References Cited

U.S. PATENT DOCUMENTS

| | | | |
|---|---|---|---|
| 5,481,684 | A | 1/1996 | Richter et al. |
| 5,574,878 | A | 11/1996 | Onodera et al. |
| 5,574,922 | A | 11/1996 | James |
| 5,615,327 | A | 3/1997 | Magee et al. |
| 5,619,665 | A | 4/1997 | Emma |
| 5,668,969 | A | 9/1997 | Fitch |
| 5,675,762 | A | 10/1997 | Bodin et al. |
| 5,678,032 | A | 10/1997 | Woods et al. |
| 5,751,982 | A | 5/1998 | Morley |
| 5,761,734 | A | 6/1998 | Pfeffer et al. |
| 5,768,593 | A | 6/1998 | Walters et al. |
| 5,832,205 | A | 11/1998 | Kelly et al. |
| 5,905,998 | A | 5/1999 | Ebrahim et al. |
| 5,983,012 | A | 11/1999 | Bianchi et al. |
| 6,031,992 | A | 2/2000 | Cmelik et al. |
| 6,047,323 | A | 4/2000 | Krause |
| 6,075,937 | A | 6/2000 | Scalzi et al. |
| 6,075,938 | A | 6/2000 | Bugnion et al. |
| 6,091,897 | A | 7/2000 | Yates et al. |
| 6,134,515 | A | 10/2000 | Skogby |
| 6,158,049 | A | 12/2000 | Goodwin et al. |
| 6,189,141 | B1 | 2/2001 | Benitez et al. |
| 6,195,676 | B1 | 2/2001 | Spix et al. |
| 6,226,789 | B1 | 5/2001 | Tye et al. |
| 6,240,490 | B1 | 5/2001 | Lyles et al. |
| 6,289,369 | B1 | 9/2001 | Sundaresan |
| 6,289,419 | B1 | 9/2001 | Takahashi |
| 6,317,872 | B1 | 11/2001 | Gee et al. |
| 6,339,752 | B1 | 1/2002 | Mann et al. |
| 6,341,371 | B1 | 1/2002 | Tandri |
| 6,345,351 | B1 | 2/2002 | Holmberg |
| 6,351,844 | B1 | 2/2002 | Bala |
| 6,381,682 | B2 | 4/2002 | Noel et al. |
| 6,430,657 | B1 | 8/2002 | Mittal et al. |
| 6,463,582 | B1 | 10/2002 | Lethin et al. |
| 6,480,845 | B1 | 11/2002 | Egolf et al. |
| 6,529,862 | B1 | 3/2003 | Mann et al. |
| 6,539,464 | B1 | 3/2003 | Getov |
| 6,728,950 | B2 | 4/2004 | Davis et al. |
| 6,738,974 | B1 | 5/2004 | Nageswaran et al. |
| 6,748,586 | B1 | 6/2004 | Gelissen |
| 6,763,328 | B1 | 7/2004 | Egolf et al. |
| 6,763,452 | B1 | 7/2004 | Hohensee et al. |
| 6,883,165 | B1* | 4/2005 | Blandy et al. .............. 717/148 |
| 6,915,513 | B2 | 7/2005 | Duesterwald et al. |
| 6,920,416 | B1 | 7/2005 | Swoboda et al. |
| 6,934,832 | B1 | 8/2005 | Van Dyke et al. |
| 6,961,806 | B1 | 11/2005 | Agesen et al. |
| 6,978,233 | B1 | 12/2005 | Burns |
| 7,047,394 | B1* | 5/2006 | Van Dyke et al. ............ 712/209 |
| 7,080,366 | B2* | 7/2006 | Kramskoy et al. ............ 717/148 |
| 7,089,539 | B2* | 8/2006 | Dornan et al. ............... 717/139 |
| 7,093,231 | B2* | 8/2006 | Nuss ............................. 717/114 |
| 7,134,119 | B2* | 11/2006 | Nevill ............................ 717/139 |
| 7,275,028 | B2 | 9/2007 | Traut |
| 7,308,685 | B2* | 12/2007 | Talwar et al. ................. 717/168 |
| 7,346,897 | B2* | 3/2008 | Vargas ........................... 717/137 |
| 7,475,394 | B2* | 1/2009 | Calder et al. ................. 717/158 |
| 7,735,073 | B1* | 6/2010 | Kosche et al. ................ 717/158 |
| 8,065,504 | B2 | 11/2011 | Yates et al. |
| 8,121,828 | B2 | 2/2012 | Yates et al. |
| 8,146,063 | B2* | 3/2012 | Lindwer et al. .............. 717/139 |
| 2001/0020224 | A1 | 9/2001 | Tomita |
| 2002/0019969 | A1 | 2/2002 | Hellestrand et al. |
| 2002/0026304 | A1 | 2/2002 | Deao et al. |
| 2002/0066086 | A1 | 5/2002 | Linden |
| 2002/0082823 | A1 | 6/2002 | Traut |
| 2002/0083278 | A1 | 6/2002 | Noyes |
| 2002/0104075 | A1 | 8/2002 | Bala et al. |
| 2002/0108107 | A1 | 8/2002 | Darnell et al. |
| 2002/0144081 | A1 | 10/2002 | Willis et al. |
| 2002/0147969 | A1 | 10/2002 | Lethin et al. |
| 2002/0199172 | A1 | 12/2002 | Bunnell |
| 2003/0093776 | A1* | 5/2003 | Hilton ........................... 717/138 |
| 2003/0093780 | A1 | 5/2003 | Freudenberger et al. |
| 2003/0171907 | A1 | 9/2003 | Gal-On et al. |
| 2003/0182653 | A1* | 9/2003 | Desoli et al. .................. 717/138 |
| 2003/0196142 | A1 | 10/2003 | Brooks |
| 2004/0015888 | A1 | 1/2004 | Fuji et al. |
| 2004/0019886 | A1* | 1/2004 | Berent et al. ................. 717/158 |
| 2009/0204785 | A1 | 8/2009 | Yates et al. |

FOREIGN PATENT DOCUMENTS

| | | |
|---|---|---|
| JP | 08-087424 A | 4/1996 |
| JP | 08-234981 | 9/1996 |
| JP | 08-272686 | 10/1996 |
| JP | 11-134307 | 5/1999 |
| JP | 11-259437 | 9/1999 |
| WO | WO 95/16967 | 6/1995 |
| WO | WO 99/03037 A1 | 1/1999 |
| WO | WO 99/44131 | 9/1999 |

OTHER PUBLICATIONS

Cifuentes et al., Experience in the design, implementation and use of a retargetable static binary translation framework, Jan. 2002, 59 pages.*
"Using Annotation to Reduce Dynamic Optimization Time", C. Krintz and B. Calder, 2001 ACM ISBN: 158113-414-Feb. 1, 2006. pp, 156-167.
"Computer Dictionary", Third Edition, Microsoft Press, 1997, excerpts including p. 467.
Office Action dated Sep. 15, 2009 (U.S. Appl. No. 12/388,728).
"A framework for remote dynamic program optimization", M. J. Voss and R. Eigenmann, Proceedings of the ACM SICPLAN workshop on dynamic and adaptive compilation and optimization table of contents pp. 32-40, 2000, pp. 32-40, ISBN: 1-58113-241-7.
"Java Multithreading" David Nelson-Gal et al., Jun. 1, 1998, Java Developer's Journal, pp. 1-4. http://jdj.sys.con.com/read/35997,htm.
IBM, "Low-Synchronization Translation Lookaside Buffer Consistency Algorithm" (ID NB9011428), IBM Technical Disclosure Bulletin, Nov. 1990, vol. 33, Issue 6B, pp. 428-433.
"Alpha Runs x86Code with FX'32", Jim Turley, Mar. 5, 1996, Microprocessor Report,.
Hoogerbrugge et al., "Pipelined Java Virtual Machine Interpreters", 2000 (15 pages).
University of Queensland, "The University of Queensland Binary Translator (UQBT) Framework", 2001, 326 pages (34 pages extracted). Online version can be obtained at <www.experimentalstuff.com/Technologies/uqbt.pdf>.
Julian Brown, "ARMphetamine—A Dynamically Recompiling ARM Emulator", May 2000, 97 pages (36 pages extracted). Online version can be obttained at'<http://armphetamine.sourceforge.net.diss.ps>.
Ball, T., et al. "Efficient Path Profiling", IEEE Proceedings of MICRO-29, Dec. 2-4, 1996, pp. 1-12.
Bala, V., et al., "Dynamo: A Transparent Dynamic Optimization System", Conference on Programming Language Design and Implemenetation, 2000, pp. 1-12.
Burke,, M.G., et al., "The Jalapeno Dynamic Optimizing Copliter for Java *tm*", IBM Thomas J. Watson Research Center Technical Paper, Mar. 1999, 13 pages (published 1999 ACM Java Grande Conference Proceedings, San Francisco, CA, Jun. 12-14, 1999).
Adve, S., et al. "Shared Memory Consistency Models: A Tutorial", IEEE Computer, vol. 29, No. 12, Dec. 1996, pp. 66-76.
Lamport, L. "How to Make a Multiprocessor Computer that Correctly Executes Multiprocess Programs", IEEE Transactions on Computers, C-28, Sep. 9, 1979, pp. 690-691.
Magnusson, P.S., "A Design for Efficient Simulation of a Multiprocessor", Proceedings of the First International Workshop on Modeling, Analysis and Simulation of Computer and Telecommuncation Systems (MASCOTS), La Jolia, CA, Jan. 1993, pp. 69-78.
Liang, et al.; An effective selection policy for load balancing in software DSM; Parallel Processing, 2000. Proceedings.2000 International Conference on Aug. 2000, pp. 105-112.
Wikipedia entries and revision histories of "Memory coherence", Consistency model, "Weak consistency", "Emulator", "Virtual machines", and Simulation, http://en.wikipedia.org.accessed Feb. 21, 2007, 21 pages.

(56) References Cited

OTHER PUBLICATIONS

Department of Defense, "DoD" Modeling and Simulation (M&S) Glossary, Jan. 1998, 175 pages.
Nichols, B., et al. "Pthreads programming: A POSIX Standard for Better Multiprocessing" (O'Reilly Nutshell), Sep. 1996.
Japanese Office Action dated Nov. 1, 2005.
Search Report dated Jan. 15, 2010.
May, C. "Mimic: A Fast System/370 Simulator", Proceedings of the Object Oriented Programming Systems Languages and Applications Conference (OOPSLA), Orlando, FL, Oct. 4-8, 1987, Special Issue of Sigplan Notices, Dec. 1987, vol. 22, No. 7, Jun. 24.
Herrod, S.A. "Using Complete Machine Simulation to Understand Computer System Behavior", Ph.D. Thesis, Stanford University, Feb. 1998.
Sullivan et al., "Dynamic native optimization of interpreters", Jun. 2003, pp. 50-57. <http://delivery.acm.org/10/1145/860000858576/p50-sullivan.pdf>.
Ogata et al. "Bytecode fetch optimization for a Java interpreter", Dec. 2002, pp. 58-67. <http://delivery.acm.org/10.1145/610000/605404/p58-ogata.pdt>.
Office Action dated (Sep. 15, 2009) U.S. Appl. No. 12/388,728.
Lai et al., "Load balancing in distributed shared memory systems"; IPCCC 1997, IEEE International; pp. 152-158.
United States Office Action dated Nov. 27, 2012 in U.S. Appl. No. 10/244,434.
United States Office Action dated Jul. 3, 2013 in U.S. Appl. No. 10/244,434.
United States Office Action dated Apr. 9, 2013 in U.S. Appl. No. 13/085,873.
Rosenburg, Bryan. Low-synchronization translation lookaside buffer consistency in large-scale shared-memory multiprocessors., 1989., vol. 23. No. 5., ACM, pp. 137-146.

\* cited by examiner

```
======= OPCODE 00000058 =======
 1  | 574976ba   rlwinm    r9,r26,14,26,29
 2  | 7d084278   xor       r8,r8,r8
 3  | 5747b6bb   rlwinm.   r7,r26,22,26,29
 4  | 41820008   be        0000074c
 5  | 7d07e82e   lx        r8,r7,r29
 6  | 7d4a5278   xor       r10,r10,r10
 7  | 574796bb   rlwinm.   r7,r26,18,26,29
 8  | 41820008   be        0000075c
 9  | 7d47e82e   lx        r10,r7,r29
10  | 73470fff   andil.    r7,r26,0x00000fff
11  | 7c885214   cax       r4,r8,r10
12  | 7c843a14   cax       r4,r4,r7
13  | 5484007e   rlwinm    r4,r4,0,1,31
14  | 548acbf4   rlwinm    r10,r4,25,15,26
15  | 7d16502e   lx        r8,r22,r10
16  | 38ea0004   cal       r7,4(r10)
17  | 7cb6382e   lx        r5,r22,r7
18  | 54870026   rlwinm    r7,r4,0,0,19
19  | 7d073a79   xor.      r7,r8,r7
20  | 4082f935   bne       000000b8
21  | 5085053e   rlwimi    r5,r4,0,20,31
/**********************************************/
22  | 80e50000   l         r7,0(r5)
23  | 7ce9e92e   stx       r7,r9,r29
/**********************************************/
24  | 3b000004   lil       r24,4
25  | 7f39c214   cax       r25,r25,r24
26  | 7ef8b851   subf.     r23,r24,r23
27  | 83590000   l         r26,0(r25)
28  | 83790004   l         r27,4(r25)
29  | 4081f935   ble       000000dc
30  | 7f0ff120   mtcr      r24
31  | 8301003c   l         r24,60(r1)
32  | 3b180001   cal       r24,1(r24)
33  | 9301003c   st        r24,60(r1)
34  | 574455ba   rlwinm    r4,r26,10,22,29
35  | 7c84e02e   lx        r4,r4,r28
36  | 7c8903a6   mtctr     r4
37  | 4e800420   bct
```

| TIME | LOAD/ STORE | COMPLEX | SIMPLE | BRANCH UNIT |
|---|---|---|---|---|
| 0 | load (31) | lil (24) | *xor (2)* | |
| 1 | | cax (25) | *rlwinm (3)* | |
| 2 | load (27) | subf (26) | *xor (6)* | *branch (4)* |
| 3 | *load (5)* | xxxxxxx | xxxxxxx | |
| 4 | | add (32) | *rlwinm (7)* | |
| 5 | *load (9)* | mcrxr (30) | *andil (10)* | *branch (8)* |
| 6 | load (28) | xxxxxx | xxxxx | |
| 7 | | | *rlwinm (1)* | bcl (29) |
| 8 | store (33) | *cax (11)* | rlwinm (34) | |
| 9 | load (35) | *cax (12)* | | |
| 10 | | mtctr (36) | *rlwinm (13)* | |
| 11 | | | *rlwinm (14)* | |
| 12 | *load (15)* | add (16) | *rlwinm (18)* | |
| 13 | *load (17)* | | | |
| 14 | | | *xor (19)* | |
| 15 | | | | *bcl (2)* |
| 16 | | | *rlwinm (21)* | |
| 17 | *load (22)* | | | |
| 18 | *store (23)* | | | bct (37) |
| 19 | | | | |

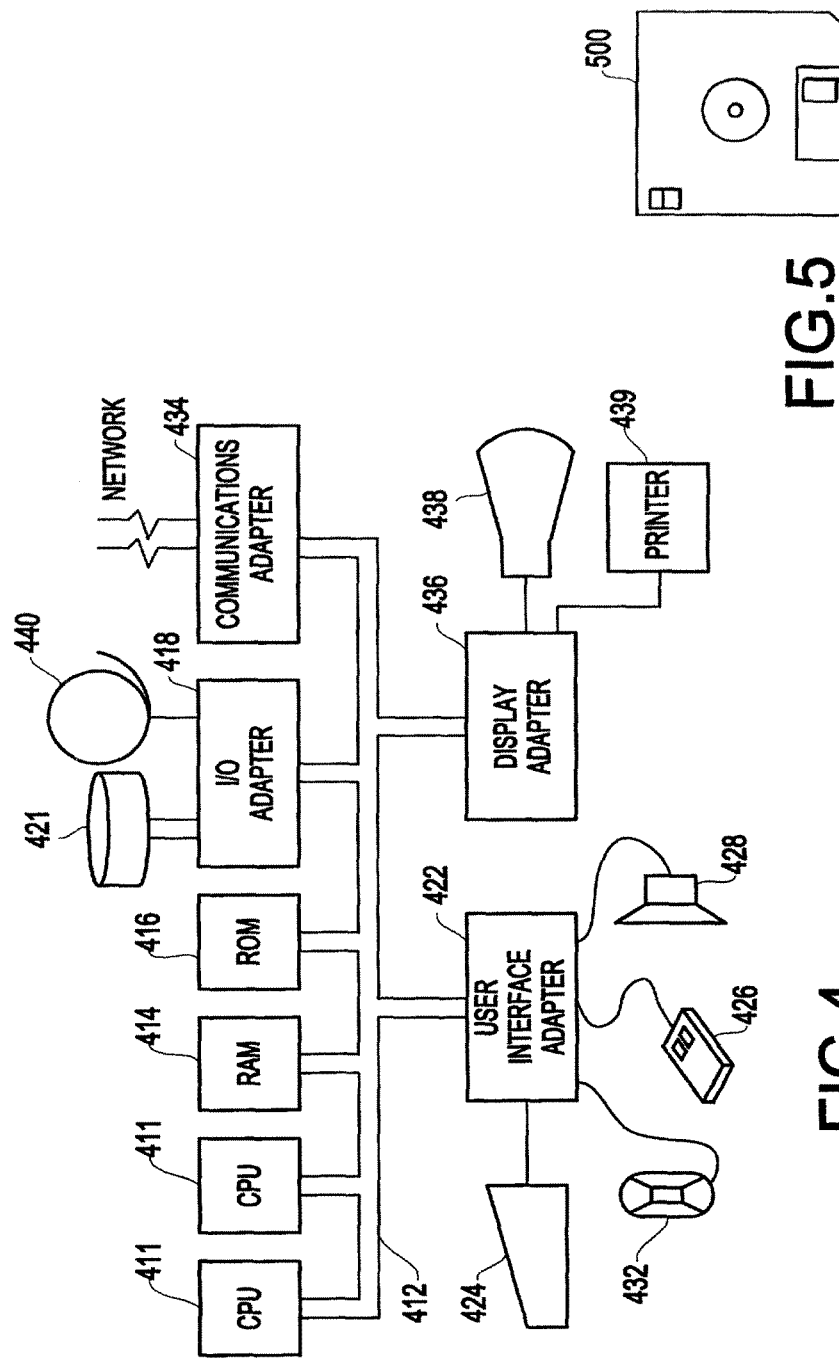

HYBRID MECHANISM FOR MORE EFFICIENT EMULATION AND METHOD THEREFOR

CROSS-REFERENCE TO RELATED APPLICATION

The present application is a Divisional Application of U.S. patent application Ser. No. 10/244,682, having a filing date of Sep. 17, 2002, now U.S. Pat. No. 8,108,843, issued on Jan. 31, 2012.

The present application is also related to:

U.S. patent application Ser. No. 10/244,434, filed on Sep. 17, 2002, to Nair et al., entitled "METHOD AND SYSTEM FOR EFFICIENT EMULATION OF MULTIPROCESSOR MEMORY CONSISTENCY";

U.S. patent application Ser. No. 10/244,414, filed on Sep. 17, 2002, to Erik R. Altman et al., entitled "METHOD AND SYSTEM FOR MULTIPROCESSOR EMULATION ON A MULTIPROCESSOR HOST SYSTEM", now U.S. Pat. No. 7,496,494, issued on Feb. 24, 2009;

U.S. patent application Ser. No. 10/244,559, filed on Sep. 17, 2002, to Nair et al., entitled "METHOD AND SYSTEM FOR EFFICIENT EMULATION OF MULTIPROCESSOR ADDRESS TRANSLATION ON A MULTIPROCESSOR HOST", now U.S. Pat. No. 7,953,588, issued on May 31, 2011; and U.S. patent application Ser. No. 10/244,564, filed on Sep. 17, 2002, to et al., entitled "METHOD AND SYSTEM FOR TRANSPARENT DYNAMIC OPTIMIZATION IN A MULTIPROCESSING ENVIRONMENT", now U.S. Pat. No. 7,146,607, issued Dec. 5, 2006, each assigned to the present assignee, and incorporated herein by reference.

BACKGROUND OF THE INVENTION

1. Field of the Invention

The present invention relates to a computer system and method, and more particularly to a method (and system) for increasing the efficiency of and accelerating the performance of emulating the behavior of one computer system on another.

2. Description of the Related Art

A major motivation for emulation, is to allow systems written for a particular architecture, to execute on another architecture, with a minimum loss of performance. Clearly then, the efficiency of the emulation process and the quality of the resulting "host" code sequence are of paramount importance.

Typically, a computing system includes several portions, including the processors, the memory, and the input/output devices. It is often necessary to emulate the behavior of one computing system on another. One of the principal reasons for emulation is to enable programs written for a system (e.g., the "target computing system"), to perform with the same results on another system (e.g., the "host computing system").

The need for emulating the behavior of one computer system on another has long been recognized. Several schemes have been proposed for doing this. A summary of these techniques appears in U.S. Pat. No. 6,031,992 to Cmelik et al. U.S. Pat. No. 6,031,992 discloses a combined hardware/software scheme to perform the emulation of the instruction set of one processor on another. This scheme allows the hardware design to incorporate features that facilitate the execution of the target instruction set. For the same reason, however, this cannot emulate all systems equally efficiently.

SimOS and SimICS are examples of systems that can emulate without special hardware features. However, their performance is not as effective as that of the method and structure of U.S. Pat. No. 6,031,992.

In general, these systems employ various levels of translation. For example, "Alpha Runs x86 Code with FX!32", Jim Turley, Mar. 5, 1996, Microprocessor Report, described techniques where the extent of translation is varied according to the extent of execution of the code.

In conventional emulation methods and techniques, various levels of translation may be employed to enhance the performance of the host instructions produced by the emulator. However, notwithstanding all the current techniques, there remains much room for improvement.

As described above, one method of emulation is disclosed that includes a combination of interpretation and translation. Each target instruction is interpreted, a simple heuristic is employed to record frequency of execution of instruction groups, and when a threshold condition is satisfied, that group is scheduled for translation by placing it in a translation pool. This technique allows the interpretation process to proceed in parallel with the translation process, and so the translator may deploy fairly aggressive optimization techniques.

This approach amortizes the cost of the optimization, and is effective for long running, frequently executed instruction sequences.

However, it may not prove so effective for execution sequences of shorter duration. Experience has shown that the emulation of complete systems results in significant portions of code which execute only once. For these cases anything other than efficient interpretation is unnecessary, and certainly the overhead of aggressive compilation is unwarranted.

There is however, a large amount of code in such system emulations which lies somewhere between the two.

Prior to the present invention, no such method has addressed specifically just such bodies of code. Indeed, there has been no technique for producing high quality translated host instructions, with little or no increase in the cost of interpretation.

In sum, to emulate a target instruction, a certain number of instructions must be executed and typically many of such instructions are highly dependent on previous instructions in the sequence. Even though modern processors employ "instruction level parallelism", in which multiple independent instructions can be executed in parallel, (execute at the same time) during emulation on most modern architectures, the potential exists for a high degree of processor under utilization. Frequently, in normal applications, there are some number of independent instructions (operations), the execution of which, with the judicious application of scheduling techniques, can be overlapped with other executing instructions. However, emulation by interpretation is an inherently serial technique, because the emulation must be performed for each of the target machine instructions sequentially, and so there is nothing in the emulation which can be overlapped. The host machine on which the emulator is executing, is potentially severely underutilized. Prior to the present invention, there has been no method (or structure) for exploiting that underutilization to increase the performance of the emulation process in a unique way.

SUMMARY OF THE INVENTION

In view of the foregoing and other problems, drawbacks, and disadvantages of the conventional methods and structures, an object of the present invention is to provide a method (and structure) which addresses bodies of code which are between long running, frequently executed instruction sequences and execution sequences of shorter duration.

Another object is to provide a method and system for producing high quality (but less than the optimized version) translated host instructions, with little or no difference to the cost of interpretation.

Another object of the present invention is to provide a method (and system) for optimizing the emulation by storing a translation in memory for subsequent re-use.

In a first aspect of the present invention, a method (and system) of performing an emulation of an operation of a target computing system, includes interpreting a target instruction, exploiting an unused capacity of a host system including a multiplicity of functional units, when the host system is interpreting the instruction, and performing a translation of the instruction without increasing the time of interpreting the instruction.

In a second aspect, in a host system, a method (and system) for using instruction scheduling to efficiently emulate the operation of a target computing system, includes a), on the host system, preparing an instruction sequence to interpret an instruction written for execution on the target computing system, b) performing instruction scheduling on the instruction sequence, to achieve an efficient instruction level parallelism for the host architecture, c) inserting a separate and independent instruction sequence, which, when executed simultaneously with that produced by the instruction scheduling, performs the following: 1) copies to a separate location the minimum instruction sequence necessary to execute the intent of the interpreted target instruction referred to as a translation; 2) modifies the interpreter code such that the next interpretation of the target instruction will result in the execution of the translated version, thereby removing the execution of the interpreter overhead and resulting in faster execution. The 6 method further includes executing, on the host system, the result of performing (c) above.

With the unique and unobvious aspects of the invention, the problems of the conventional techniques are overcome. Indeed, the steps involved in interpreting a target instruction of a system being emulated are such that there is very little scope for parallel execution of the host instructions which carry out the intent of that instruction. Essentially, the interpreter must fetch each instruction, decode its intent, and carry out that action. In a large number of cases the action of the target instruction is relatively simple. There is not enough work to fully occupy the host machine. Moreover, because the interpreter must step through the target instructions in order, there is no room to combine the actions of more than one instruction in order to provide more material in which to detect host instruction level parallelism.

Thus, the inventors have provided a technique which recognizes (and overcomes the problems of) a machine with a multiplicity of functional units, which often operates significantly below its full capacity during the interpretation phase of emulation (or bytecode translation).

Further, the method of the invention recognizes (and takes advantage of) that such a machine has unused capacity during much of the time that it is emulating the target system.

Hence, the invention provides a method of applying this spare capacity to the task of speeding up the execution of the emulated target system.

Further, the invention can be beneficially applied to bytecodes and Java® in particular.

BRIEF DESCRIPTION OF THE DRAWINGS

The foregoing and other purposes, aspects and advantages will be better understood from the following detailed description of a preferred embodiment of the invention with reference to the drawings, in which:

FIG. 2 shows a typical code sequence 200 necessary to emulate a LOAD instruction, including the host instruction sequence to perform the intent of the target instruction (a LOAD in this example), and the interpreter code to fetch and branch to the next target instruction to be emulated, (here referred to as "interpreter overhead");

FIG. 3A illustrates an execution 350 of a target load instruction on a typical machine with multiple functional units;

FIG. 4 illustrates an exemplary hardware/information handling system 400 for incorporating the present invention therein; and FIG. 5 illustrates a signal bearing medium 500 (e.g., storage medium) for storing steps of a program of a method according to the present invention.

DETAILED DESCRIPTION OF PREFERRED EMBODIMENTS OF THE INVENTION

Figure 1:
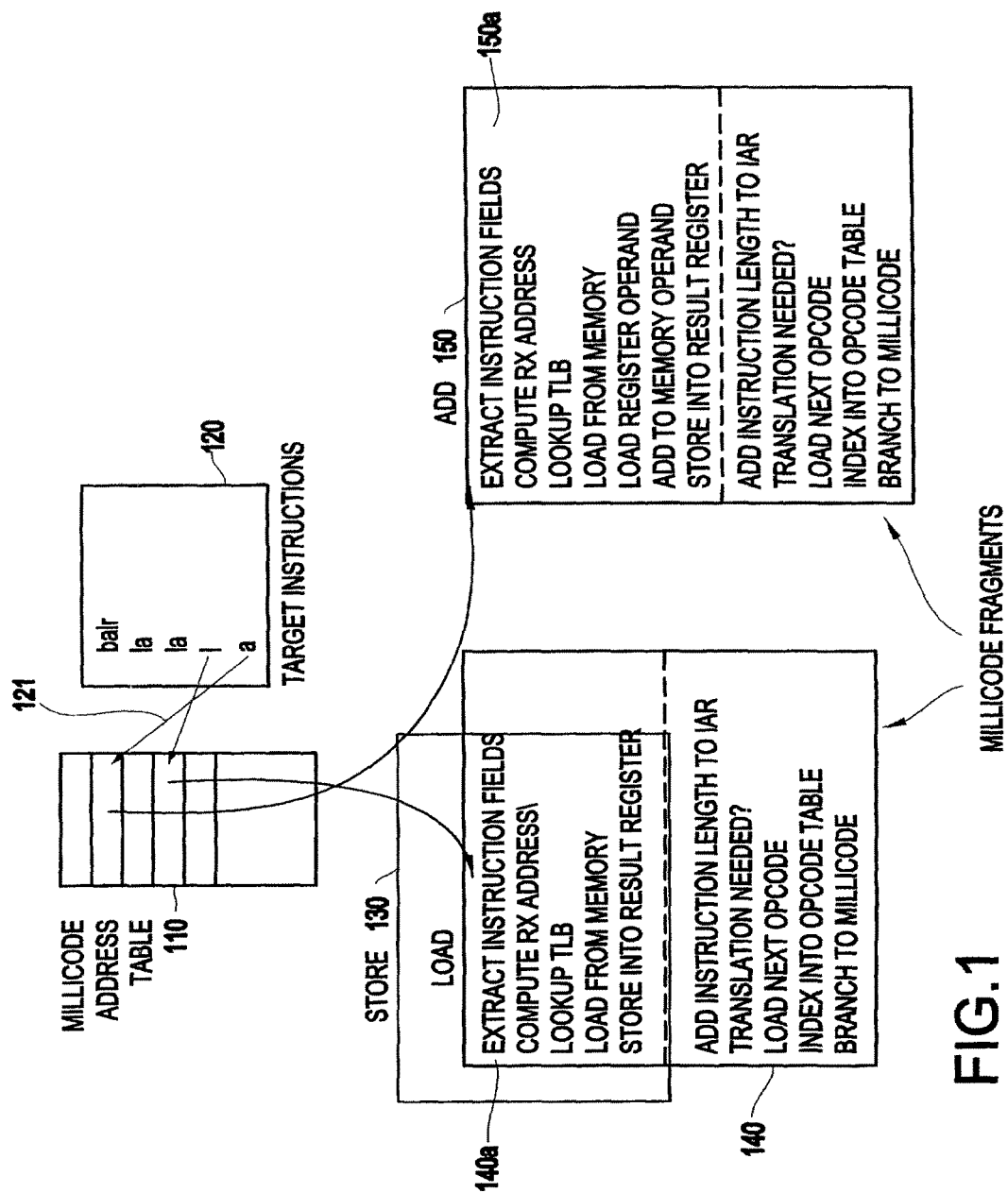
FIG. 1 illustrates a high level view of an interpreter according to the present invention.

Referring now to the drawings, and more particularly to FIGS. 1-5, there are shown preferred embodiments of the method and structures according to the present invention.

Preferred Embodiment

Turning now to the drawings, FIG. 1 illustrates a threaded interpreter 100 which is employed in the method of the present invention. For purposes of the invention, "interpreter" represents a component of an emulator in which each target instruction of the machine of interest (e.g., an IBM System 390 processor "store", "load" etc. instruction) is translated to an appropriate sequence of host instructions.

The interpreter of the invention is an "indirect threaded interpreter" in which no "loop control" is employed. That is, conventional interpretation typically uses a loop to perform the following steps: 1) fetch an instruction; 2) decode the instruction to determine what type of instruction is present; 3) call the subroutine which knows how to perform the action for that instruction; and 4) iterate until all instructions have been interpreted in a repetitive manner. This has drawbacks since there is a certain amount of overhead associated with such action.

To avoid such drawbacks, the method of the invention employs an indirect threaded interpreter. The interpreter control is embedded in the action routines for each target instruction, and the fetched instruction is used as an index into a table of action routines. To expand further, each instruction is implemented by a fragment of code which performs a number of tasks, including execution of the intent of the target instruction, computation of the address of the next target instruction to be executed, fetching of the target instruction at that address, lookup using the fetched target instruction as an index into a table of addresses to find the next action address and finally, branching to this address. For some instructions, this list will be modified slightly. As can be seen from this, there is no overall interpreter loop in this system. Each action directly branches to its successor, having first determined what that should be. In addition to the tasks enumerated above, each action routine must keep certain global quantities (stored in machine registers) current, for example the program counter of the target machine.

It is noted that the indirect threaded interpreters are known in the art, but the indirect threaded interpreter of the invention performs a more efficient operation.

As shown in FIG. 1, the interpreter 100 includes a millicode address table 110 (it is noted that the target instructions are not part of the interpreter per se; rather they are what the interpreter operates upon), and various millicode fragments containing the host instructions for the various target operations such as, for example, a store instruction sequence 130, a load instruction sequence 140, and an add instruction sequence 150.

The interpreter 100 performs interpretation by sequentially stepping through each one of the target instructions 120 and using its opcode as an index into the millicode address table 110. The term "millicode" as used herein refers to the swatches of host instructions which are employed to execute the intent of a single target instruction. In FIG. 1, these swatches are referred to as "millicode fragments".

Appended to each millicode fragment (e.g., 140a and 150a) is the instruction sequence necessary to compute the address of, and branch to, the "millicode fragment" for the next target instruction to be executed.

Thus, it will be evident that there is no loop in the interpreter 100, but rather that execution proceeds by appending or "threading" the host instructions for each target instruction onto the string of previously executed host instructions.

Further, it is clear from FIG. 1 that each of the millicode fragments (a load and add are shown) contain a small number of essential instructions (e.g., those required to reproduce the effect of the target instruction), and the remainder of the work done pertains to either computing the address in host memory of the emulated target memory, or effecting the branch to the next sequential target instruction.

It is noted that, for clarity, the exemplary structure of FIG. 1 shows the minimum code sequence necessary. However, there are in fact many more steps required in the actual host code sequences, such as the steps required to check for translation lookaside buffer (TLB) misses, or the steps required to check and maintain consistency of shared memory accesses where appropriate.

Hence, in FIG. 1, there is shown how the interpreter 100 operates, and specifically the arrows 121 from the sequence of target instructions to the millicode address table 110 illustrate that by using the opcode that it is possible to look-up an address of the action routine (the normal millicode routine). The slots in the millicode address table 110 are pointing at examples of various millicode such as the store 130, the load 140 and the add 150. Additionally, the millicode shown is subdivided (e.g., as shown by the dotted line separating the millicode fragment blocks) between the useful code and the overhead code (e.g., the portion below the dotted line is the overhead code as constituted, for example, by the fetching of the next instruction, etc.). It is noted that while FIG. 1 shows the two millicode "chunks" independently, in actuality (and as described in further detail below with regard to FIG. 3A) the millicode chunks are typically intermixed by the scheduler, for more efficient execution.

FIG. 2 illustrates a sample listing 200 of the host instruction sequence produced for a target load instruction, including the essential instructions and the interpreter overhead. FIG. 2 illustrates a sequential operation, without any scheduling having been performed (as in FIG. 3B described below).

That is, FIG. 2 illustrates a logical sequence 200 of instructions in which some instructions depend on other instructions (and must remain in that sequence), whereas some instructions (e.g., instruction 31) which have no dependencies on preceding instructions, can be moved (or scheduled) into earlier time slots. Thus, if instructions do not depend on anything else, then they can be reordered to another available slot, thereby overlapping execution, and decreasing the total execution time for the instruction sequence. Again, the goal is efficient emulation of an instruction of another machine (e.g., in the case of FIG. 2, a Load instruction is being emulated of an IBM System 390O processor). To perform an emulation, the machine must perform the same as the other machine would in performing a load instruction and must emulate storage into registers etc. associated with the load.

FIG. 3A shows a table 300 which represents the execution of the millicode fragment for a target architecture load instruction over different time slots 301. In the exemplary table of FIG. 3A, it is assumed that there are a plurality (e.g., three) functional units 302-304 and a branch unit 305. Obviously, other combinations are possible, as indeed are other architectures (e.g., VLIW).

That is, FIG. 3A represents a particular machine which can perform four different operations at once (given certain circumstances) including a load/store 302, a complex arithmetic operation 303, a simple arithmetic operation 304, and a branch 305. Thus, if four instructions could be found which are independent, then the four instructions could be performed at one time. If there is only one independent instruction to process, then the other three slots are empty. The invention uses this empty space to optimize the emulation.

In FIG. 3A, the instructions which represent the essential work of the target instruction are shown in italics. The remainder of the instructions are those required to do the fetching of the next instruction and the taken path edge profiling. For purposes of the present application, "taken path edge profiling" is defined as recording which path of a branch instruction was executed, for use in later path based optimizations. It is noted that the number in the instructions (e.g., load (31)) corresponds to the instruction number of the corresponding instruction in the listing 200 of FIG. 2.

In the illustrative operation of FIG. 3A, the two sets of instructions have been scheduled manually, and the empty slots in the table 300 represent essentially idle time in the execution of this target instruction. These empty slots are used by the invention to place the code which stores the essential instructions, referred to herein as the "translation". Again, it is only the essential instructions (as opposed to other instructions used for sequencing or the like) which need be executed during an emulation as the host machine will do the sequencing automatically. Performing only the essential instructions will reduce time significantly, and is the preferred mode of operation.

It is noted that some slots have been blocked out (e.g., "X'd"-out) since they represent unusable slots due to branching code (or delay due to the branch).

It is apparent from the table in FIG. 3A that there is ample room to schedule in the instructions required to produce this translation of the currently executing target instruction. The invention allows an optimization of such scheduling, by inserting into these empty slots, the code necessary to copy out the essential instructions to a location in memory.

Figure 3B:
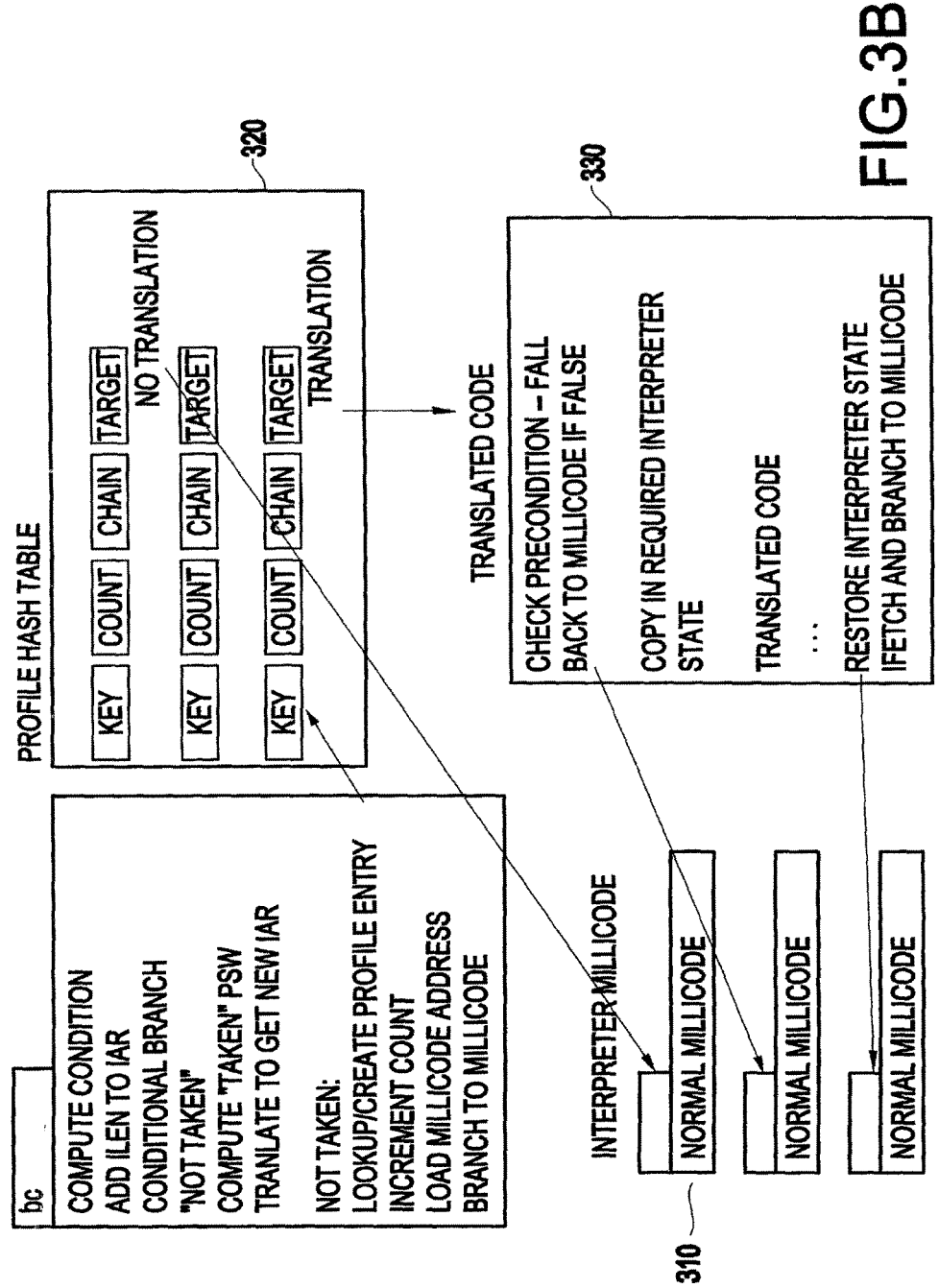
FIG. 3B describes the interface between the interpreted and translated code.

In subsequent runs, the invention can merely access the essential instructions, as shown in FIG. 3B.

FIG. 3B shows the interaction, via a profile hash table 320, between the interpreter (or millicode fragments) 310 and the translated code 330 which was created as interpretation proceeded.

The crossover between each of the execution modes in this hybrid scheme occurs in this example while emulation of a target branch instruction is taking place. The host instructions included in the millicode fragment for a branch instruction, for example, perform the following steps. It is noted that the invention is not limited to this example but other scenarios are possible for enhancing/optimizing the crossover, including another example mentioned below.

A first step includes hashing into the profile table 320 with a combination of the current iar (instruction address register) and either the next sequential, or the target (whichever is the "taken" path), instruction. (The profile table 320 is an edge table).

In a second step, if a translation has already been performed for the instructions at the location of the taken path, then the address of this will be in the table 320, and execution will proceed by branching to that location.

Otherwise, in a third step, the profile table 320 will return the address of the appropriate millicode fragment. Before branching to that location, however, the profile table entry corresponding to the beginning of the current block (for which this branch designates the end), is located, and the address of the just completed translation is placed there.

The "translation" includes a plurality (e.g., three in an exemplary embodiment) of sections. For example, a first section includes a header which checks a precondition, and falls back to interpretation if it is false, otherwise it copies in the interpreter state required for correct execution of the translation.

A second section contains the code to effect the intent of the target instruction. The third portion (e.g., trailer section) restores interpreter state and returns control to the appropriate millicode fragment.

Another embodiment of the approach would entail translating across branches and falling back to interpretation only when the branch exits translated code. (This is another example of an alternative crossover approach, and is potentially more optimal, since it allows for longer translations than 13 would occur if the check is done on every branch). The chief advantage of this approach is to amortize the cost of saving and restoring interpreter state (i.e. the work done in the header and trailer sections) over larger chunks of translated code.

Thus, with the invention, for the first interpretation of an operation, the invention executes the essential instructions and other overhead instructions. However, in subsequent runs, only the essential instructions need be accessed, thereby leading to time savings.

With the unique method and structure of the present invention, while interpreting an instruction, the interpreter can also translate it into a form which will result in faster execution on a subsequent visit.

That is, the inventive method and structure realizes that the work of translating the instruction can be interleaved with the work of interpretation such that, on machines with sufficient unused capacity, the cost of translation is effectively zero.

Thus, the inventive method preserves the advantages of interpretation (e.g., the lower cost for infrequently executed paths), but it gains some of the advantages of compilation. More particularly, the invention does this by removing, at no extra cost, the overhead of fetching and decoding each sequential target instruction.

There also are opportunities for other improvements, since the translation of one target instruction can be done in the context of those previously translated, allowing for a limited amount of peephole optimization.

As mentioned above, the inventive method employs an indirect threaded interpreter. That is, an "indirect threaded interpreter" represents an interpreter in which no loop is employed, as in the conventional interpreters. Instead, the interpreter control is embedded in the action routines for each target instruction, and the fetched instruction is used as an index into a table of action routines.

That is, each instruction is implemented by a fragment of code which performs a number of tasks including, for example, execution of the intent of the target instruction, computation of the address of the next target instruction to be executed, fetching of the target instruction at that address, lookup using the fetched target instruction as an index into a table of addresses to find the next action address and finally, branching to this address. For some instructions, this list will be modified slightly.

As is evident and as discussed briefly above, there is no overall interpreter loop in the inventive system. Each action directly branches to its successor, having first determined what that should be. In addition to the tasks enumerated above, each action routine must keep certain global quantities (e.g., stored in machine registers) current (e.g., the program counter of the target machine). For each action routine, the work to be performed can be completed in some minimum number of cycles. The minimum time is at least as great as the length of the longest dependence chain between the instructions that implement the action. As a practical matter, the fetching of the next instruction typically takes longer than the execution of the present instruction. 15

If there is enough spare capacity within this time to enable a translation to be made, then the cost of that translation is essentially zero. This is a key advantage of the present invention.

Moreover, a key aspect of the present invention is that the present inventors have recognized that, even in doing the best job in scheduling the code (the nonessential code and the essential code for interpreting), there is still underutilized hardware in the system. This underutilization is taken advantage of, to produce a translation of the instruction which is being emulated, so that afterwards the translation of the instructions can be used to perform (subsequently) the same work in a shorter amount of time.

Thus, FIG. 3A represents a scheduling which is being employed by the invention, as the invention seeks to fill up the slots (the blank spaces) in the Table 300 as much as possible and to produce (and subsequently use) a translation including the bold-faced instructions in FIG. 3A.

Hereinbelow is an example of the results of translation according to the present invention given the millicode of FIG. 3A, and specifically a translation of part of a target program in the S/390 instruction set. Millicode fragments are shown from the threaded interpreter for the three instructions translated below.

The unscheduled millicode sequences for 3 S390 (target) instructions, are shown followed by a typical translation of these millicode sequences. The translations are produced from code which executes in the empty slots of the scheduled millicode sequences.

Part One: S/390(Target) Code Sequence ar r6,r5 mr r8,r6 sr r9,r8

Part Two: Sample Millicode Sequences (Host Instructions)

```
Mnemonic ar == Opcode 0000001a ==== [S390 Add Register
Instruction]
--
00001834    | 574876ba    rlwinm  r8=r26,14,26,29
00001838    | 7d28e82e    lwzx    r9=r8,r29
0000183c    | 574a96ba    rlwinm  r10=r26,18,26,29
00001840    | 7ceae82e    lwzx    r7=r10,r29
00001844    | 7ce93e15    addo.   r7=r9,r7 [cr0,xer=xer]
00001848    | 7ce8e92e    stwx    =r7,r8,r29
0000184c    | 4e800000    mcrf    r20=r0
00001850    | 3b000002    addi    r24=r0,2
00001854    | 7f39c214    add     r25=r25,r24
00001858    | 7ef8b851    subf.   r23=r24,r23 [cr0=xer]
0000185c    | 83590000    lwz     r26=r25,0
00001860    | 83790004    lwz     r27=r25,4
00001864    | 4081e9b9    bcl     =4,r1,14958 [lr=]
00001868    | 7d000400    mcrxr   r8 [xer=xer]
0000186c    | 83010078    lwz     r24=r1,120
00001870    | 3b180001    addi    r24=r24,1
00001874    | 93010078    stw     =r24,r1,120
00001878    | 57445d78    rlwinm  r4=r26,11,21,28
0000187c    | 7c84e02a    ldx     r4=r4,r28
00001880    | 7c8903a6    mtspr   =r4 [ctr=]
00001884    | 4e800420    bcctr   =20,r0[=ctr ]
00001a9c    | 574b76ba    rlwinm  r11=r26,14,26,29
00001aa0    | 390b0004    addi    r8=r11,4
00001aa4    | 7d28e82e    lwzx    r9=r8,r29
00001aa8    | 574796ba    rlwinm  r7=r26,18,26,29
00001aac    | 7d47e82e    lwzx    r10=r7,r29
00001ab0    | 7ce95096    mulhw   r7=r9,r10
00001ab4    | 7cebe92e    stwx    =r7,r11,r29
00001ab8    | 7ce951d6    mullw   r7=r9,r10
00001abc    | 7ce8e92e    stwx    =r7,r8,r29
00001ac0    | 3b000002    addi    r24=r0,2
00001ac4    | 7f39c214    add     r25=r25,r24
00001ac8    | 7ef8b851    subf.   r23=r24,r23 [cr0=xer]
00001acc    | 83590000    lwz     r26=r25,0
00001ad0    | 83790004    lwz     r27=r25,4
00001ad4    | 4081e749    bcl     =4,r1,14802 [lr=]
00001ad8    | 7d000400    mcrxr   r8 [xer=xer]
00001adc    | 83010078    lwz     r24=r1,120
00001ae0    | 3b180001    addi    r24=r24,1
00001ae4    | 93010078    stw     =r24,r1,120
00001ae8    | 57445d78    rlwinm  r4=r26,11,21,28
00001aec    | 7c84e02a    ldx     r4=r4,r28
00001af0    | 7c8903a6    mtspr   =r4 [ctr=]
00001af4    | 4e800420    bcctr   =20,r0[=ctr]
Mnemonic sr == Opcode 0000001b ==== [S390 Subtract
Register]
000019d0    | 574876ba    rlwinm  r8=r26,14,26,29
000019d4    | 7d28e82e    lwzx    r9=r8,r29
000019d8    | 574a96ba    rlwinm  r10=r26,18,26,29
000019dc    | 7ceae82e    lwzx    r7=r10,r29
000019e0    | 7ce74c51    subfo.  r7=r7,r9 [cr0,xer=xer]
000019e4    | 7ce8e92e    stwx    =r7,r8,r29
000019e8    | 4e800000    mcrf    r20=r0
000019ec    | 3b000002    addi    r24=r0,2
000019f0    | 7f39c214    add     r25=r25,r24
000019f4    | 7ef8b851    subf.   r23=r24,r23 [cr0=xer]
000019f8    | 83590000    lwz     r26=r25,0
000019fc    | 83790004    lwz     r27=r25,4
00001a00    | 4081e81d    bcl     =4,r1,14855 [lr=]
00001a04    | 7d000400    mcrxr   r8 [xer=xer]
00001a08    | 83010078    lwz     r24=r1,120
00001a0c    | 3b180001    addi    r24=r24,1
00001a10    | 93010078    stw     =r24,r1,120
00001a14    | 57445d78    rlwinm  r4=r26,11,21,28
00001a18    | 7c84e02a    ldx     r4=r4,r28
00001a1c    | 7c8903a6    mtspr   =r4 [ctr=]
00001a20    | 4e800420    bcctr   =20,r0 [=ctr]
```

Part Three: Translation of Part of a Target Program in the S/390 Instruction Set The following host instruction sequence represents a translation, stored at a separate memory location, for the sample target instruction sequence. On each subsequent encounter of the Add instruction, the translation of the three 18 target instructions will be executed. This represents a significant savings in execution time, 29 instructions as opposed to 65 instructions in the millicode sequence.

The target instruction is in register r26; its address is in r25; r29 contains the address of the emulated register file for the Target (s/390) processor.

Control falls through from one translation to the next.

```
..Target Instruction ......... ar r6,r5 ..........
    rlwinm  r8=r26,14,26,29
    lwzx    r9=r8,r29
    rlwinm  r10=r26,18,26,29
    lwzx    r7=r10,r29
    addo.   r7=r9,r7 [cr0,xer=xer]
    stwx    =r7,r8,r29
    mcrf    r20=r0
    addi    r25=r25,2
    lwz     r26=r25,0
....End of translation 1 .........................
..Target Instruction ......... mr r8,r6 ..........
    rlwinm  r11=r26,14,26,29
    addi    r8=r11,4
    lwzx    r9=r8,r29
    rlwinm  r7=r26,18,26,29
    lwzx    r10=r7,r29
    mulhw   r7=r9,r10
    stwx    =r7,r11,r29
    mullw   r7=r9,r10
    stwx    =r7,r8,r29
    addi    r25=r25,2
    lwz     r26=r25,0
....End of translation 2..........................
..Target Instruction ......... sr r9,r8 ..........
    rlwinm  r8=r26,14,26,29
    lwzx    r9=r8,r29
    rlwinm  r10=r26,18,26,29
    lwzx    r7=r10,r29
    subfo.  r7=r7,r9 [cr0,xer=xer]
    stwx    =r7,r8,r29
    mcrf    r20=r0
    addi    r25=r25,2
    lwz     r26=r25,0
....End of translation 3..........................
```

Consider now, the set of instructions which perform simple operations such as loading and storing data from memory, or performing arithmetic on such data. In these cases, on modern processors, the longest path in the action routine is associated with determining the address of the next action and branching to it (e.g., because computed branches are so expensive). Typically, the action itself (which is independent of the next address computation), can be overlapped with this longest path.

Additionally, in the inventive method, another memory location is written to with the instructions needed to accomplish the action itself.

Using such a technique, a sequence of simple target instructions are interpreted, and, for each one, the corresponding host instructions are written to subsequent locations in the translated host instruction stream. It remains only to arrange for this translated stream to be executed in place of the interpretation of the original target code sequence, for a significant improvement in performance to be realized. The resulting program execution is a hybrid of interpretation and execution.

In the simplest cases such as those mentioned above, translation is relatively short (e.g., usually two or three instructions).

However, there are instructions which are sufficiently complex that the effort needed to write out all the host instructions comprising their translation, will be more than that afforded by the slack in the schedule of the action routine. For these cases, a call instruction will be written out.

This call instruction will be to a routine which simply performs the action, and returns to the following target instruction. Although there is overhead involved in the call and return, the call is to a known location, and so is likely to be faster than the computed branch required in the interpretive case.

The other important class of instructions, are the branch and jump class including both conditional and unconditional branches in the target instruction set. In the case of these instructions, there is no action component to be performed. Instead, the entire action is to compute the address of the next target instruction and proceed to process it.

In the inventive method, the slack time of these instructions is used to accomplish the work necessary to tie together the previously translated portions of code, (e.g., "fragments"), and the interpreted target instruction stream. This is also where the work is done to reconcile all the global state necessary to move between the interpretation and translation modes of execution.

Thus, looking again at FIG. 2 which shows an action routine (e.g., the actual code of the action routine) and FIG. 3A which shows the timing of the action routine of FIG. 2, in the emulation mode, a branch would be performed to the first instruction (e.g., a load) and the instruction would be executed, and then a branch would be taken to the next action routine, which would have been decoded in the process of doing it, and so forth.

Hence, with the present invention with a translation having been performed, there would be a shorter sequence of this particular instruction (e.g., the load) stored somewhere else in memory, and subsequently when the process came back to execute this same instruction (e.g., the load) again, then the invention would branch to this shorter sequence (e.g., as shown in FIG. 3B) instead of the action routine. As a result, greater efficiency and high speed emulation are achieved.

Thus, in general, when the emulator of the invention meets an instruction it will interpret the instruction and perform a translation, but afterwards (e.g., in a next encounter of the same instruction) it will branch simply to the translation (e.g., the shorter sequence) of the instruction, thereby to optimize the emulation. Thus, instructions (or portions of instructions) do not have to be repetitively executed through a loop control.

Instead, as shown in FIG. 3B, the interpreter determines whether the instruction has been translated and thus the interpreter determines at any point what mode it should be in (e.g., whether it is in the interpretive mode or in mode of executing a translation). For example, as shown in FIG. 3B, each time the interpreter comes to a branch instruction, the interpreter checks whether there is a translation for the sequence of instructions which are between the present branch instruction and a next branch instruction (e.g., a so-called "basic block").

If there is no translation, then the interpreter fetches and interprets the normal millicode 310 (the action routine which includes essential instructions and any overhead instruction; FIG. 2 is an example of a normal millicode instructions) and executes the instructions. Simultaneously, (or interleaved with) the interpreter performs a translation of the instruction. Again, such a translation need only be performed once after the first time of encountering a non-translated instruction.

It is noted that the profile hash table 320 of FIG. 3B includes a key, a count (e.g., a value indicating the number of times this particular branch has been executed), a chain, and a target. Hence, for each branch there is an entry indicating whether there is a translation or not. It is noted that the target may include a translation either produced offline, or produced by the invention by having the translation code scheduled into the normal millicode. Regardless, the same technique is used to switch (e.g., to choose whether) to do the interpretation or the translation in either case, as shown in FIG. 3B.

Hence, if the interpreter determines that a translation exists, then the interpreter branches to the translation of the normal millicode, as described above.

Thus, as described above, the invention can insert a translation into the normal millicode to optimize the emulation. As such, in the invention, there is emulation and "level 0" translation for each instruction (as opposed to "level 1" translation which is translation of an entire sequence of instructions which may be one block or more than one block and which is a rather "heavyweight" solution, more suited to long-running codes).

Finally, as a basis of comparison, without the unique advantages of the method and system of the present invention, the conventional emulator would execute the normal millicode the first time an instruction is encountered, and then the next time the instruction is encountered ("gone to") the same repetitive operations would be performed regardless of the count (number of times the instruction is encountered). At some point (e.g., 100 times, 1000 times, etc.) of performing the same repetitive operations of the normal millicode, the count of the profile would reached a predetermined threshold number, and another component would be triggered (activated) to perform a translation and then one would execute the translation and that would be faster than the repetitive operations.

However, with the invention, the first time that one sees the instruction, the normal millicode is executed, but as a byproduct of this execution and without any increase in execution time (since the empty slots of FIG. 3A are being used), a translation is produced of the code which is shorter than running the normal millicode, and the next time that that instruction is emulated, the system executes that translation. Thus, the translation is performed much quicker in the invention without taking any more time, and thus it comes for "free" (no time penalty) without having to rely on the count reaching a predetermined high number.

Figure 3C:
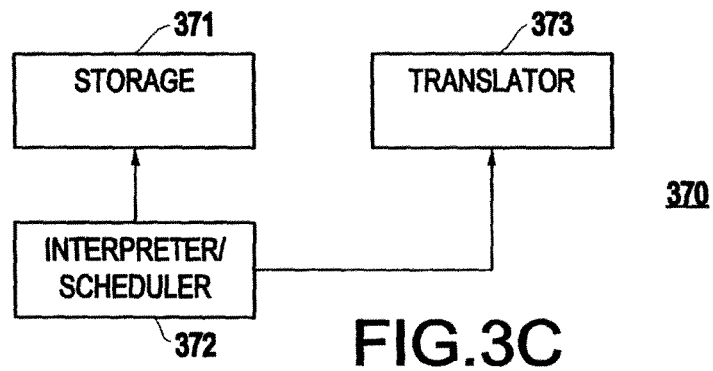
FIG. 3C illustrates an upper level block diagram of the system according to the present invention.

Turning now to FIG. 3C, an upper level diagram of a system 370 for using an instruction scheduling to efficiently emulate the operation of a target computing system is shown according to the invention.

The system 370 incorporates the components shown in FIGS. 1 and 3B, and includes functional blocks including a storage 371 for storing a translation of the millicode.

Interpreter/scheduler 372 block is for preparing, on the host system, an instruction sequence to interpret an instruction written for execution on the target computing system, and for performing instruction scheduling on the instruction sequence, to achieve an efficient instruction level parallelism as represented by pipeline delay slots, for the host system.

Translator 373 is for inserting, in the pipeline delay slots, a separate and independent instruction sequence, which, when executed simultaneously with the instruction sequence produced by the interpreter/scheduler 372, copies to a separate location a minimum instruction sequence necessary to execute an intent of an interpreted target instruction, such that the interpreted target instruction is a translation. Further, the translator modifies the interpreter code such that a next execution of said target instruction results in execution of the translated version thereby removing execution of interpreter overhead.

Figure 3D:
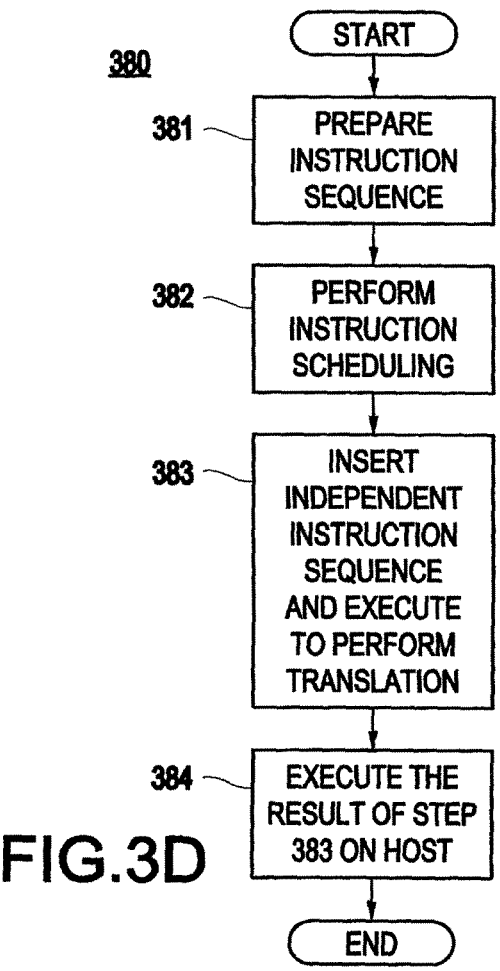
FIG. 3D illustrates a flowchart of the inventive method.

Further, FIG. 3D illustrates a flowchart of the method 380 of the invention for using instruction scheduling to efficiently emulate the operation 23 of a target computing system. The method, as implemented, resides on a host system which emulates the target.

A first step 381 includes preparing, on the host system, an instruction sequence to interpret an instruction written for execution on the target computing system.

Then, step 382 includes performing instruction scheduling on the instruction sequence, to achieve an efficient instruction level parallelism as represented by pipeline delay slots, for the host system.

Thereafter, step 383 includes inserting, in the pipeline delay slots, a separate and independent instruction sequence, which, when executed simultaneously with the instruction sequence produced by step 382, performs several substeps.

A first substep includes copying to a separate location a minimum instruction sequence necessary to execute an intent of an interpreted target instruction, the interpreted target instruction being a translation.

A second substep includes modifying the interpreter code such that a next execution of the target instruction results in execution of the translated version, thereby removing execution of interpreter overhead.

Thereafter, in step 384, the result of performing step 383 is executed on the host system.

It is noted that the technique disclosed in the present application described exemplarily with reference to the emulation of a generic target system with a complex instruction set computer (CISC) instruction set on a typical modern superscalar processor with a reduced instruction set computer (RISC) instruction set architecture. The methods described are equally applicable to emulation on any modern processors such as very long instruction word (VLIW), and indeed to the interpretation of Bytecodes (Java® or otherwise) on any of the above-mentioned types of processors. For purposes of the present invention, a superscalar processor is defined as a microprocessor architecture that enables more than one instruction to be executed per clock cycle (e.g., Pentium®, PowerPC®, etc.), whereas a VLIW processor is defined as an architecture which executes groups (or long words) of instructions in a single cycle, but relies on software (in this case the interpreter) to fill those groups or words, as known by one of ordinary skill in the art.

FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for 25 connecting the bus 412 to a display device 438 and/or printer 439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" 26 or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Hence, the method and system of the present invention achieves increased performance, at no extra cost, of any system/application using interpretation. Such systems/applications could be an emulation system, or any bytecode interpreter such as JavaO, or Smalltalk. These systems/applications, when running on processor architectures which execute multiple instructions in a single cycle, would overcome the inherently serial nature of interpretation by using the present invention to quickly and cheaply produce a more efficient execution.

While the invention has been described in terms of several preferred embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. In a host system, a method for using instruction scheduling to efficiently emulate the operation of a target computing system, said method comprising:
   (a) preparing, on the host system, an instruction sequence to interpret an instruction written for execution on the target computing system;
   (b) performing instruction scheduling on the instruction sequence, to achieve an efficient instruction level parallelism, for the host system; and
   (c) inserting, a separate and independent instruction sequence, which, when executed simultaneously with the instruction sequence produced by (b), performs the following:
      i) copies to a separate location a minimum instruction sequence necessary to execute an intent of an interpreted target instruction, said interpreted target instruction being a translation; and ii) modifies the interpreter code such that a next interpretation of said target instruction results in execution of the translated version, thereby removing execution of interpreter overhead.

2. The method of claim 1, further comprising:
(d) executing, on the host system, a result of performing (c) above.

3. The method of claim 1, wherein the instruction scheduling of (b) is performed with respect to a very long instruction word (VLIW) architecture of said target computing system.

4. The method of claim 1, wherein the interpretation is conducted with reference to a stream of bytecodes of the target computing system.

5. The method of claim 4, wherein said bytecodes comprise Java® bytecodes.

6. A host system for using instruction scheduling to efficiently emulate the operation of a target computing system, said host system comprising a memory having tangibly embodied therein a set of instructions for:
(a) an interpreter for preparing, on the host system, an instruction sequence to interpret an instruction written for execution on the target computing system;
(b) a scheduler for performing instruction scheduling on the instruction sequence, to achieve an efficient instruction level parallelism as represented by pipeline delay slots, for the host system; and
(c) a translator for inserting, in the pipeline delay slots, a separate and independent instruction sequence, which, when executed simultaneously with the instruction sequence produced by (b), performs the following:
i) copies to a separate location a minimum instruction sequence necessary to execute an intent of an interpreted target instruction, said interpreted target instruction being a translation; and
ii) modifies the interpreter code such that a next execution of said target instruction results in execution of the translated version, thereby removing execution of interpreter overhead.

7. A non-transitory storage medium tangibly embodying a program of machine-readable instructions executable by a digital processing apparatus to perform a method of, in a host system, using instruction scheduling to efficiently emulate the operation of a target computing system, said method comprising:
(a) preparing, on the host system, an instruction sequence to interpret an instruction written for execution on the target computing system;
(b) performing instruction scheduling on the instruction sequence, to achieve an efficient instruction level parallelism, for the host system; and
(c) inserting a separate and independent instruction sequence, which, when executed simultaneously with the instruction sequence produced by (b), performs the following:
i) copies to a separate location a minimum instruction sequence necessary to execute an intent of an interpreted target instruction, said interpreted target instruction being a translation; and
ii) modifies the interpreter code such that a next interpretation of said target instruction results in execution of the translated version, thereby removing execution of interpreter overhead.

\* \* \* \* \*